United States Patent Office

3,347,790
Patented Oct. 17, 1967

3,347,790
LUBRICATING COMPOSITIONS CONTAINING METAL SALTS OF ACIDS OF PHOSPHORUS
Norman A. Meinhardt, Lyndhurst, Ohio, assignor to The Lubrizol Corporation, Wickliffe, Ohio, a corporation of Ohio
No Drawing. Filed July 1, 1965, Ser. No. 468,965
13 Claims. (Cl. 252—32.5)

This invention relates to metal salts of organic phosphorus acids and to a process for preparing the same.

Metal salts of phosphorus acids such as phosphorothioic acids, phosphinic acids, and phosphonic acids find use in many applications. They are specially useful as additives in hydrocarbon compositions, plastics, resins, paints, lubricants, fuels, greases, etc. In most applications, an important consideration of the utility of such metal salts is their resistance to degradation due to heat or oxidation. A great deal of effort has been devoted to the preparation of such metal salts having improved thermal and oxidative stability.

Another consideration which relates to the commercial usefulness of such metal salts is the convenience and cost of the processes by which they are produced. Thus, it is desirable to have processes which are capable of producing such metal salts in high yields and which can be carried out under convenient process conditions.

It is, accordingly, an object of this invention to provide improved metal salts of phosphorus acids.

Another object of this invention is to prepare metal salts of phosphorus acids which have enhanced resistance to thermal and oxidative degradation.

Another object of this invention is to prepare basic metal salts of phosphorus acids.

Another object of this invention is to provide an improved process for preparing metal salts of phosphorus acids.

Another object of this invention is to provide hydrocarbon compositions.

Another object of this invention is to provide fuel and lubricating compositions.

These and other objects are accomplished by providing an improvement in the process for preparing metal salts of phosphorus acids comprising the reaction of a Group II metal base with a phosphorus acid of the structural formula

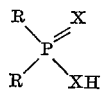

wherein R is selected from the class consisting of hydrocarbon and hydrocarbon-oxy radicals and X is selected from the class consisting of oxygen and sulfur, the improvement comprising carrying out the process in the presence of a catalyst selected from the class consisting of carboxylic acids having up to 10 aliphatic carbon atoms and salts thereof with a metal selected from the class consisting of Group I metals, Group II metals, aluminum, iron, nickel, cobalt, and copper.

The improved process of this invention is especially useful in preparing metal salts of phosphorothioic acids, phosphinothioic acids and phosphonothioic acids. These acids, as indicated previously, are represented by the above formula wherein the two R radicals may each be hydrocarbon or hydrocarbon-oxy radicals. The hydrocarbon group of the radical may contain up to about 200 carbon atoms and may be an alkyl, aryl, aralkyl, alkenyl, or cycloalkyl radical. It may contain one or more polar substituents such as ether, halo, nitro, and the like. Such polar substituents usually account for no more than about 10% by weight of the R radical.

Phosphorothioic acids, i.e., those conforming to the above formula wherein each of the two R radicals is a hydrocarbon-oxy radical, are exemplified by dibutylphosphorodithioic acid, dipentylphosphorodithioic acid, di-octylphosphorodithioic acid, diisooctylphosphorodithioic acid, diphenylphosphorodithioic acid, dinaphthylphosphorodithioic acid, didecylphosphorodithioic acid, dinonadecylphosphorodithioic acid, di-(heptylphenyl)phosphorodithioic acid, di-(tetrapropylene-substituted phenyl)-phosphorodithioic acid, di-(polyisobutene(molecular weight of 420)-substituted phenyl)-phosphorodithioic acid and the corresponding monothioic analogs of the foregoing acids.

Phosphorodithioic acids are most conveniently prepared by the reaction of four moles of an alcohol or phenol with one mole of phosphorus pentasulfide such as is described in U.S. 2,838,555 and U.S. 3,000,822. The acids of these patents contain mixed organic radicals and are especially desirable in preparing metal salts useful in hydrocarbon compositions and lubricants. They are characterized by two organic radicals, one of which contains less than 5 carbon atoms and the other of which contains at least 5 carbon atoms, the molar ratio of the former to the latter being within the range of 1:1 and 3:1.

Phosphinothioic acids useful in the improved process of this invention include ditolylphosphinodithioic acid, bis-(dichlorophenyl)phosphinodithioic acid, di-(octylphenyl)phosphinodithioic acid, di(pentylphenyl)phosphinomonothioic acid, di-(octylnaphthyl)phosphinodithioic acid, chlorophenyl isopropylphenylphosphinomonothioic acid, di-(isopropylphenyl)phosphinodithioic acid, di-(ethylphenyl)phosphinodithioic acid, ditolylphosphinodithioic acid, diphenylphosphinodithioic acid, di-(phenylthiophenyl)phosphinodithioic acid, di-(chlorophenyl)phosphinodithioic acid, dihexylphosphinodithioic acid, di-octadecylphosphinodithioic acid, dinaphthylphosphinodithioic acid, dibehenylphosphinodithioic acid, and dicyclohexylphosphinodithioic acid.

Mixtures of phosphorous acids are likewise useful in the process of this invention. They include the acids obtained by the reaction of a phosphorus sulfide such as phosphorus pentasulfide, phosphorus sesquisulfide, or phosphorus heptasulfide with a hydrocarbon such as an olefin, olefin polymer, or liquid petroleum fraction. The product of such reaction is usually a complex mixture containing predominantly phosphinothioic acids and phosphonothioic acids. The reaction by which such product is obtained is usually carried out at temperatures ranging from about 100° C. to 300° C. or higher and involves mixing the hydrocarbon reactant with from about 0.5% to about 15% (by weight) of a phosphorus sulfide. The reaction is well-known in the art and conditions for it likewise are well-known and need not be described in further detail here. The hydrocarbon reactants useful in such reactions may be liquid petroleum fractions having a boiling point of up to 600° F., olefins having from about 4 to 30 carbon atoms, and olefin polymers such as polybutenes and polypropylenes having molecular weights ranging from about 150 to about 100,000.

The foregoing phosphorus acids are converted to their corresponding metal salts by treatment with a basic metal compound such as the oxide, hydroxide, hydride, carbonate, bicarbonate, sulfide, methoxide, ethoxide, or phenoxide of the metal such as lithium, potassium, sodium, aluminum, barium, calcium, strontium, magnesium, zinc, iron, cobalt, nickel, copper, or cadmium. The most frequently used basic metal compounds are the oxides, carbonates, and hydroxides of zinc, barium, calcium, and cadmium.

As indicated previously, the improved process of this invention involves carrying out the reaction of a phosphorus acid and a metal base in the presence of a catalyst. The catalyst is a carboxylic acid having up to about 10 aliphatic carbon atoms or a metal salt thereof. The acid may contain up to about 3 carboxylic radicals. Specific examples of these catalysts include formic acid, acetic acid, propionic acid, butyric acid, benzoic acid, trimelletic acid, o-phthalic acid, succinic acid, maleic anhydride, 1,3-cyclohexanedioic acid, decylbenzoic acid, toluic acid, valeric acid, caproic acid, sebacic acid, 2-heptanoic acid, itaconic acid, caprylic acid, 4-nonanoic acid, 3-decanoic acid, phenylacetic acid, naphthoic acid, 9-phenylstearic acid, dibutylbenzoic acid, and the salts thereof of a metal indicated above. Where a metal carboxylate is used as the catalyst, it is preferably the carboxylate of the same metal that is present in the metal salt of phosphorus acid produced by the process of this invention. Metal carboxylates useful as the catalyst are, for example, zinc acetate, calcium formate, barium butanoate, cobalt propionate, ferrous acetate, magnesium octanoate, cadmium naphthoate, cuprous acetate, nickel acetate, nickel phthalate, sodium acetate, potassium decanoate, lithium acetate, sodium benzoate, aluminum propionate, etc.

A small amount of catalyst is effective to bring about the desired results of the process of this invention. Thus, the catalyst may be present in the reaction mixture at a concentration ranging from about 0.001 to about 0.2 equivalent per equivalent of the phosphorus acid in the reaction mixture. The preferred concentration of the catalyst is from about 0.01 to 0.1 equivalent per equivalent of the phosphorus acid.

The catalyst is effective to promote a more complete utilization of the reactants in the process of this invention and it results also in a higher yield of the desired product. Another advantage of the process of this invention is that the product so obtained has improved qualities as additives for use in lubricants. The effectiveness of the catalyst in these regards is especially noteworthy in the preparation of basic metal salts of phosphorus acids by reacting a phosphorus acid with a stoichiometrically excess amount (e.g., at least 1 and up to about 2 equivalents per equivalent of the acid) of the metal base.

The term "basic metal salts" is used herein to describe salts wherein the metal is present in stoichiometrically greater amounts than the phosphorus acid radical. For instance, a "normal" or "neutral" zinc phosphorodithioate has two equivalents (i.e. one mole) of zinc per two equivalents (i.e. 2 moles) of a phosphorodithioic acid, whereas a "basic" zinc phosphorodithioate has more than two equivalents of zinc per two equivalents of the phosphorodithioic acid. An example of the basic metal salt is the metal salt described in U.S. 2,794,780 or Journal of Organic Chemistry, volume 27, pages 1484 and 1485 (1962).

The process of this invention, except for the use of the catalyst, can be carried out under conditions which are known to be suitable for the reaction of a phosphorus acid and a metal base. Such conditions usually include a temperature of from about 25° C. to the decomposition point of the reaction mixture. The preferred reaction temperature is within the range from about 50° C. to about 200° C. The reaction can be effected simply by mixing the phosphorus acid and the metal base; it may be carried out in the presence of a diluent or solvent which facilitates the control of the reaction temperature and the mixing of the reactants. Solvents useful for this purpose are illustrated by benzene, toluene, xylene, naphtha, chlorobenzene, dioxane, nitrobenzene, hexane and mineral oil.

A particularly convenient method of carrying out the process of this invention involves adding the metal base in small increments to a mixture of the phosphorus acid and the catalyst in a solvent. Another method involves adding the phosphorus acid to a mixture of the metal base and the catalyst. Still another method involves preparing a slurry of the metal base in a diluent and mixing the slurry with the phosphorus acid and the catalyst. Where the catalyst is a metal carboxylate, it may be formed in situ in the reaction mixture from the corresponding carboxylic acid and the metal base present in the reaction mixture.

The formation of the metal salt by the process of this invention is usually accompanied by the formation of by-products such as water. In most instances the by-products are separated from the metal salt by distillation, filtration, evaporation, precipitation or any such well-known means.

The process of this invention is useful also for the formation of metal salts of a mixture of the above-described phosphorus acid and up to about two equivalents, per equivalent of the phosphorus acid, of a hydrocarbon-substituted succinic acid having at least about 50 aliphatic carbon atoms in the hydrocarbon substituent. The mixture, in many instances, consists of the two acids in ratios of equivalents ranging from 0.1:1 to about 2:1. The sources of the hydrocarbon substituent in the succinic acid include principally the high molecular weight substantially saturated petroleum fractions and substantially saturated olefin polymers, particularly polymers of mono-olefins having from 2 to 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of the olefins such as those illustrated above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil-solubility of the final products derived from such interpolymers. Thus, for reasons of oil solubility and stability the interpolymers contemplated for use in this invention should be substantially aliphatic and substantially saturated, i.e., they should contain at least about 80%, preferably at least about 95%, on a weight basis, of units derived from the aliphatic mono-olefins and no more than about 5% of olefinic linkages based on the total number of carbon-to-carbon covalent linkages. In most instances, the percentage of olefinic linkages should be less than 2% of the total number of carbon-to-carbon covalent linkages.

Specific examples of such interpolymers include the copolymer of 95% (by weight) of isobutene with 5% of styrene; the terpolymer of 98% of isobutene with 1% of piperylene and 1% of chloroprene; the terpolymer of 95% of isobutene with 2% of 1-butene and 3% of 1-hexene; the terpolymer of 80% of isobutene with 10% of 1-pentene and 10% of 1-octene; the copolymer of 80% of 1-hexene and 20% of 1-heptene; the terpolymer of 90% of isobutene with 2% of cyclohexane and 8% of propene; and the copolymer of 80% of ethylene and 20% of propene.

Another source of hydrocarbon radicals comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers having molecular weights of about 750–5000 is preferred. Higher molecular weight olefin polymers having molecular weights from about 10,000 to about 100,000 or higher have been found to impart viscosity index improving properties to the final products of this invention. The use of such higher molecular weight olefin polymers often is desirable. It will be noted that the hydrocarbon substituent in the succinic acid likewise may contain inert polar groups. Thus, in this respect, it may be a radical which is substantially hydrocarbon in character, i.e., the polar groups are not present in proportion sufficiently large to alter the hydrocarbon character of the hydrocarbon substituent. The polar groups are exemplified by chloro, bromo, keto, ether, aldehyde, nitro, etc. The upper limit with respect to the proportion of such polar groups in a hydrocarbon substituent is usually about 10% based on the weight of the hydrocarbon portion of the substituent.

The succinic acids are readily available from the reaction of maleic anhydride with a high molecular weight olefin or a chlorinated hydrocarbon such as the olefin polymer described hereinabove. The reaction involves merely heating the two reactants at a temperature about 100°–200° C. The product from such a reaction is a succinic anhydride having a large hydrocarbon substituent. The hydrocarbon substituent may contain olefinic linkages which may be converted, if desired, to saturated, paraffinic linkages by hydrogenation. The anhydride may be hydrolyzed by treatment with water or steam to the corresponding acid. It will be noted in this regard that the anhydride is equivalent to the acid insofar as its utility in the preparation of the product of A is concerned. In fact, the anhydride is often more reactive than the acid and is often preferred.

In lieu of the olefins or chlorinated hydrocarbons, other hydrocarbons containing an activating polar substituent, i.e., a substituent which is capable of activating the hydrocarbon molecule in respect to reaction with maleic acid or anhydride, may be used in the above-illustrated reaction for preparing the succinic acid. Such polar substituents may be illustrated by sulfide, disulfide, nitro, mercaptan, bromine, ketone, or aldehyde radicals. Examples of such polar-substituted hydrocarbons include polypropene sulfide, di-polyisobutene disulfide, nitrated mineral oil, di-polyethylene sulfide, brominated polyethylene, etc. Another method useful for preparing the succinic acids and anhydrides involves the reaction of itaconic acid with a high molecular weight olefin or a polyar-substituted hydrocarbon at a temperature usually within the range of about 100° C. to about 200° C.

Where the relative amounts of the reactants of the process of this invention are described in terms of chemical equivalents, the equivalent weight of a reactant is based on the number of the functional groups present within its molecular structure. Thus, the equivalent weight of a phosphorus acid is based on the number of phosphorus acid radicals present in the molecule. A dialkylphosphorodithioic acid, for instance, has one equivalent per mole and so also does a dialkylphosphinomonothioic or dithioic acid. The equivalent weight of a substituted succinic acid having one succinic group per molecule has two equivalents per mole. The equivalent weight of a Group II metal base is one-half its molecular weight and the equivalent weight of a Group II metal carboxylate is likewise one-half its molecular weight. The equivalent weight of the carboxylic acid useful as the catalyst herein depends on the number of the carboxylic acid radicals present in the molecule. To illustrate, p-phthalic acid (or phthalic anhydride) has two equivalents per molecule, maleic acid (or maleic anhydride) has two equivalents per molecule, trimelletic anhydride has three equivalents per molecule and acetic acid has one equivalent per molecule.

The following examples illustrates the process of this invention:

*Example 1*

O,O'-di-i-octylphosphorodithioic acid (1113 grams, 3 equivalents) is added to a mixture of 1,000 grams of benzene, 183 grams (4.5 equivalents) of zinc oxide, and 13 grams (0.12 equivalent) of zinc acetate dihydrate throughout a 1.25 hour period at 21°–49° C. The reaction mixture is heated at 68°–85° C. for 1 hour whereupon 32 ml. of water is distilled off. The residue is filtered. The filtrate is heated to 80° C./80 mm. and again filtered. The second filtrate (1006 grams) is an oil solution of a basic zinc salt having a zinc content of 10.1%, a phosphorus content of 7.31%, a sulfur content of 15.61%, and a Zn:P weight ratio of 1.38. For the purpose of comparison, the above procedure is repeated without the use of zinc acetate dihydrate in the reaction mixture and the product (944 grams) obtained by this procedure has a zinc content of 9.71%, a phosphorus content of 7.62%, a sulfur content of 15.64%, and a Zn:P weight ratio of 1.27 bromphenol blue indicator.

*Example 2*

Zinc oxide (60 grams, 1.5 equivalents) is added to a mixture (1484 grams, 4 equivalents) of O,O'-di-i-octylphosphorodithioic acid and 17 grams (0.16 equivalent) of zinc acetate dihydrate at 23°–27° C. Thereafter, three increments of zinc oxide (each consisting of 60 grams) are added while the reaction temperature rises to 72° C. The reaction mixture is purged with nitrogen at 70°–80° C. for 2 hours and then heated at 75° C./20 mm. for one hour. The residue is filtered. The filtrate (1487 grams) has a zinc content of 10.3%, a phosphorus content of 7.29%, a sulfur content of 15.89%, and a Zn:P weight ratio of 1.42. A product prepared by a procedure identical to the above procedure except that no zinc acetate dehydrate is present in the reaction mixture is found to have a zinc content of 9.92%, a phosphorus content of 7.46%, a sulfur content of 16.4%, and a Zn:P weight ratio of 1.33.

*Example 3*

O,O'-di-i-octylphosphorodithioic acid (6100 grams, 16 equivalents) is added to the mixture of 3500 ml. of benzene, 977 grams (24 equivalents) of zinc oxide, and 33.8 grams (0.34 equivalent) of zinc acetate dihydrate at 22°–57° C. in 2.5 hours. The reaction mixture is heated at 40°–50° C. for 3 hours and then heated to 91° C. to distill off 150 grams of water. The residue is filtered and the filtrate is heated to 90° C./70 mm. to distill volatile components and again filtered. The final filtrate (5364 grams) has a zinc content of 9.93%, a phosphorus content of 7.32%, a sulfur content of 15.46%, and a Zn:P weight ratio of 1.35.

*Example 4*

An O,O'-dialkylphosphorodithioic acid (824 grams, 3 equivalents) (prepared by reacting one mole of $P_2S_5$ with 4 moles of an alcohol mixture consisting of 65 mole percent of iso-butanol and 35 mole percent of primary-amyl alcohol) is added to a mixture of 1300 grams of benzene, 407 grams of mineral oil, 159 grams (3.9 equivalents) of zinc oxide, and 14 grams (0.13 equivalent) of zinc acetate dihydrate at 26°–51° C. The reaction mixture is heated at 65°–86° C. for 2.25 hours whereupon 32 ml. of water is distilled off. The residue is filtered. The filtrate is heated to 85° C./10 mm. and again filtered. The final filtrate (1150 grams) has a zinc content of 8.99%, a phosphorus content of 6.9%, a sulfur content of 14.86%, and a Zn:P weight ratio of 1.29. Another experiment is carried out, which is similar to the above experiment except that no catalyst is used in the reaction. In this experiment a total of 4.5 equivalents (15% more than in the above experiment) of zinc oxide is required to give a product having a Zn:P weight ratio of 1.3.

Example 5

A mixed phosphorodithioic acid (3 equivalents) having a phosphorus content of 12.4% and a sulfur content of 25.7% and prepared as described in Example 4, is added to a mixture of 140 grams of mineral diluent oil, 122 grams (3 equivalents) of zinc oxide, and 17.6 grams (0.16 equivalent) of zinc acetate dihydrate throughout a period of 2 hours at 25°–50° C. The reaction mixture is heated for one hour at 50° C., mixed with water (90 grams), heated to 100° C./160 mm. in two hours, mixed with a filtering aid, and filtered. The filtrate (951 grams, equal to 91% of the theoretical yield) is an oil solution of a neutral zinc salt having a zinc content of 9.91%, a phosphorus content of 9.26%, a sulfur content of 19.9%, and a Zn:P weight ratio of 1.07 (theory: 1.065). Another experiment is carried by the above procedure except that no catalyst is used. In this experiment, 10% more of zinc oxide than in the above experiment is required to produce a product (882 grams, equal to 84% of the theoretical yield) having a Zn:P weight ratio of 1.07.

Example 6

O,O'-di-(tetrapropylene-substituted phenyl)phosphorodithioic acid (1316 grams, 2 equivalents) in 700 grams of benezene is added to a mixture of 700 grams of benzene, 609 grams of mineral oil, 122 grams (3 equivalents) of zinc oxide, and 14 grams (0.13 equivalent) of zinc acetate dihydrate at 24°–55° C. The reaction mixture is refluxed at 75°–89° C. for 3 hours whereupon 18.5 ml. of water is distilled off. The reaction mixture is filtered and the filtrate is heated to 100° C./80 mm. The residue is again filtered. The final filtrate (1693 grams) has a zinc content of 3.76%, a phosphorus content of 3.06%, and a sulfur content of 5.45%, and a Zn:P weight ratio of 1.23. The above procedure is repeated without the use of zinc acetate dihydrate in the reaction mixture and the product so obtained has a zinc content of 3.19%, a phosphorus content of 3.07%, a sulfur content of 5.57%, and a Zn:P weight ratio of 1.04.

Example 7

Acetic acid (3.28 grams, 0.05 equivalent) is added to a mixture of 2048 grams of mineral oil and 328 grams (8.05 equivalents) of zinc oxide. To this mixture, there is added at 23°–40° C. 4557 grams (7 equivalents) of O,O'-di-(tetrapropylene-substituted phenyl)phosphorodithioic acid (percent P=4.85, percent S=10.31) in 1000 grams of benzene. The reaction mixture is held at 40° C. for 0.5 hour, refluxed for 2 hours whereupon 63 ml. of water is distilled off. The residue is filtered. The filter pad is washed with 500 grams of benzene and the washing is combined with the filtrate. The filtrate is heated to 110° C./30 mm. and the residue is filtered. The final filtrate (6158 grams equal to 90.5% of the theoretical yield) has a zinc content of 3.45%, a phosphorus content of 3.33%, and a sulfur content of 6.69%, and a Zn:P weight ratio of 1.04.

Example 8

O,O'-di-(tetrapropylene-substituted phenyl)phosphorodithioic acid (1310 grams, 2 equivalents) is added to a mixture of 598 grams of mineral oil, 93.8 grams (2.3 equivalents) of zinc oxide, and 4.4 grams (0.04 equivalent) of zinc acetate dihydrate at 70° C. The reaction mixture is heated at 70° C., mixed with 27.9 grams of water, heated at 110° C./30 mm., mixed with a filtering aid, and filtered. The filtrate or product (1737 grams, equal to 88.5% of the theoretical yield), has a zinc content of 3.72%, a phophorus content of 3.29%, a sulfur content of 6.55%, and a Zn:P weight ratio of 1.13. The above procedure is repeated except that no zinc acetate dihydrate is present in the reaction mixture, and 2.5 equivalents of zinc oxide is used. A metal salt is obtained in 76.5% of the theoretical yield and has a Zn:P weight ratio of 0.94.

Example 9

O,O'-di-(tetrapropylene-substituted phenyl)phosphorodithioic acid (791 grams, 1.27 equivalents) is added to a mixture of 363 grams of mineral oil, 64.8 grams (1.59 equivalents) of zinc oxide, and 6.94 grams (0.0635 equivalent) of zinc acetate dihydrate throughout a period of 6.25 hours at 70°–73° C. The reaction mixture is heated to 70° C., mixed with 19 grams of water, heated at 93° C./40 mm., and filtered. The filtrate (1062 grams) has a zinc content of 4.43%, a phosphorus content of 3.23%, a sulfur content of 6.47%, and a Zn:P weight ratio of 1.37.

Example 10

O,O'-di-(tetrapropylene-substituted phenyl)phosphorodithioic acid (440 parts by weight, 0.695 equivalent) is added to a mixture of 223 parts of mineral oil, 32.5 parts (0.695 equivalent) of zinc oxide, and 1.53 parts (0.0139 equivalent) of zinc acetate dihydrate at 68°–73° C. The reaction mixture is stirred for 1.5 hours at 73° C., mixed with 9.7 parts of water, heated to 93° C./100 mm. in 4 hours, maintained at 93° C./100 mm. for 0.5 hour, mixed with a filtering aid and filtered. The filtrate (629 parts) has a zinc content of 3.52%, a phosphorus content of 3.22%, a sulfur content of 6.45%, a Zn:P weight ratio of 1.07.

Example 11

O,O'-di-(tetrapropylene-substituted phenyl)phosphorodithioic acid (4633 grams, 6.97 equivalents) in 2 liters of xylene is added to a mixture of 2 liters of xylene, 370 grams (9.06 equivalents) of zinc oxide, and 24.3 grams (0.212 equivalent) of zinc acetate dihydrate at 96°–130° C. and the reaction mixture is heated at 96° C. for 3 hours, heated at 150° C. to distill off 66.7 grams of water, mixed with a filtering aid, and filtered. The filtrate is admixed with 1855 grams of mineral oil, heated to 140° C./25 mm., and filtered. The final filtrate (5860 grams) has a zinc content of 4.01%, a phosphorus content of 3.18%, a sulfur content of 6.57%, and a Zn:P weight ratio of 1.31.

Example 12

Caproic acid (7.4 grams, 0.064 equivalent) is added to a mixture of 291 grams of mineral oil and 63.7 grams (1.56 equivalents) of zinc oxide at 70° C. To this mixture there is added at 70°–80° C. 628 grams (1 equivalent) of O,O'-di-(tetrapropylene-substituted phenyl)phosphorodithioic acid. The mixture is heated at 80°–90° C. for 0.5 hour, mixed with 19 grams of water, heated at 90° C./20 mm. for 0.5 hour, and filtered. The filtrate (821 grams) is an oil solution of the product.

Example 13

Di-(heptylphenyl)phosphorodithioic acid (300 parts by weight, 0.59 equivalent) is added to a mixture of 258 parts of mineral oil, 28 parts (0.688 equivalent) of zinc oxide, and 1.4 parts (0.0129 equivalent) of zinc acetate dihydrate at 71°–76° C. The mixture is heated at 70° C. for one hour, mixed with 8.4 parts of water and heated at 93° C./100 mm. for one hour. The residue is filtered. The filtrate (542 parts) has a zinc content of 3.57%, a phosphorus content of 3.11%, a Zn:P weight ratio of 1.09.

Example 14

A mixture of 276 grams (0.4 equivalent) of O,O'-di-(tetrapropylene - substituted phenyl)phosphorodithioic acid and 416 grams (1.6 equivalents) of an O,O'-dialkyl-phosphorodithioic acid prepared as described in Example 4 in 300 grams of benzene is added to a mixture of 339 grams of mineral oil, 122 grams (3 equivalents) of zinc oxide, and 3.95 grams (0.036 equivalent) of zinc acetate dihydrate in one hour at 25°–43° C. The reaction mixture is heated at 30°–40° C. for 3 hours and then heated to 105° C. to distill off 19.4 grams of water. It is mixed with a filtering aid and filtered. The filtrate is heated to 100° C./54 mm. and the residue is filtered. The final filtrate (869 grams) has a zinc content of 7.06%, a phosphorus content of 5.72%, a sulfur content of 11.52%, and a Zn:P weight ratio of 1.24.

Example 15

A phosphorus acid is prepared by mixing 944 parts (by weight) of polyisobutene (1000 molecular weight) with 85 parts of phosphorus pentasulfide at 260° C. for about 5 hours and thereafter hydrolyzing the mixture with steam at 150°–155° C. The acid has a phosphorus content of 2.37% and an acid number of 40 (phenolphthalein indicator). A diarylphosphorodithioic acid is prepared by mixing 1468 grams (4.0 moles) of an alkylated phenol (alkylated by reacting phenol with a commercial $C_{15-20}$ 1-olefin) and 222 grams (1 mole) of phosphorus pentasulfide for 3 hours at 110°–115° C., heating the reaction mixture at 125° C. for one hour and filtering the product. The product has a phosphorus content of 3.48%, a sulfur content of 6.98% and an acid number of 61. A mixture of 1400 grams (1 equivalent) of the phosphorus acid derived from polyisobutene and 949 grams (1 equivalent) of the diarylphosphorodithioic acid in 3200 grams of benzene is added to a mixture of 600 grams of mineral oil, 500 grams of benzene, 122 grams (3 equivalents) of zinc oxide, and 12 grams (0.109 equivalent) of zinc acetate dihydrate at 22°–27° C. in 1.25 hours. The reaction mixture is stirred for 3 hours at 27°–24° C., heated to distill off 22 grams of water, and filtered. The filtrate is heated to 90° C./25 mm., mixed with 400 grams of mineral oil and a filtering aid, and filtered. The filtrate (2723 grams) has a phosphorus content of 1.85%, a zinc content of 2.29%, a sulfur content of 2.92%, and a Zn:P weight ratio of 1.24.

Example 16

A mixture of 1400 grams (1 equivalent) of phosphorus acid derived from polyisobutene of Example 15 and 645 grams (1 equivalent) of O,O′-di-(tetrapropylene-substituted phenyl)phosphorodithioic acid in 700 grams of benzene and 600 grams of mineral oil is added to a slurry of 800 grams of benzene, 108 grams (2.66 equivalents) of zinc oxide, and 8 grams (0.073 equivalent) of zinc acetate dihydrate. The reaction mixture is heated at reflux for one hour, mixed with a filtering aid, and filtered. Benzene is distilled off and the residue is filtered. The filtrate (2281 grams) has a zinc content of 2.77%, a phosphorus content of 1.85%, a sulfur content of 3.52%, and a Zn:P weight ratio of 1.5.

Example 17

The procedure of Example 1 is repeated except that the dioctylphosphorodithioic acid is replaced on a chemically equivalent basis with dibehenylphosphorodithioic acid and zinc acetate is replaced on a chemically equivalent basis with zinc dioctanoate.

Example 18

A phosphorus acid is obtained by mixing a polyisobutene (molecular weight of 375)-substituted phenol (4900 grams, 10 equivalents), 1685 grams of mineral oil at 100° C. and sulfur dichloride (515 grams, 10 equivalents) at 105°–150° C. and then reacting 500 grams of the sulfurized phenol with 45 grams of phosphorus pentasulfide in the presence of 150 grams of mineral oil at 80° C. The acid has a phosphorus content of 1.49%, a sulfur content of 5.1%, and an acid number of 25 (bromphenol blue indicator). A portion of the acid (536 grams, 0.24 equivalent) is added to a mixture of 500 ml. of benzene, 15 grams (0.368 equivalent) of zinc oxide, and 6 grams (0.06 equivalent) of zinc acetate dihydrate in 1 hour at 25°–28° C. The reaction mixture is heated at 80° C. to distill off water, heated to 90° C./20 mm., and filtered. This filtrate (484 grams) has a zinc content of 2.38%, a phosphorus content of 1.54%, a sulfur content of 4.91%, and a Zn:P weight ratio of 1.54.

Example 19

The procedure of Example 1 is repeated except that the dioctylphosphorodithioic acid is replaced on a chemically equivalent basis with dicyclohexylphosphorodithioic acid and zinc acetate is replaced on a chemically equivalent basis with zinc benzoate.

Example 20

A 45.5% toluene solution (695 grams) containing one equivalent of di(iso-propylphenyl)phosphinodithioic acid is added to a mixture of 114 grams of toluene, 61 grams (1.5 equivalents) of zinc oxide, and 5.5 grams (0.05 equivalent) of zinc, acetate dihydrate while the reaction mixture temperature is maintained at 70° C. The reaction mixture is heated at 70° C. for one hour, heated to 40° C./10 mm. to distill off 300 grams of toluene and 7 grams of water, diluted with toluene and filtered. The filtrate (588 grams) has a zinc content of 4.56%, a phosphorus content of 3.65%, a sulfur content of 7.06%, and a Zn:P weight ratio of 1.25. Another experiment, similar to the above except that no zinc acetate is used, results in a product having a zinc content of 3.16%, a phosphorus content of 3.74%, a sulfur content of 7.26%, and a Zn:P weight ratio of 0.845.

Example 21

O,O′-di-(tetrapropylene-substituted phenol)phosphorodithioic acid (6.16 grams, 1 equivalent) is added to a mixture of 301 grams of mineral oil, 96.3 grams (1.5 equivalents) of cadmium oxide, and 6.7 grams (0.05 equivalent) of cadmium acetate dihydrate at 70° C. The reaction mixture is heated at 70° C. for 2 hours and then at 90° C./30 mm. for 0.5 hour, and filtered. The filtrate (795 grams) has a cadmium content of 6.76%, a phosphorus content of 3.08%, a sulfur content of 6.36%, a Cd:P weight ratio of 2.19. Another experiment, similar to the above except that no cadmium acetate is used as the catalyst, results in a product having a cadmium content of 6.27%, and a Cd:P weight ratio of 1.58.

Example 22

O,O′--di-(tetrapropylene-substituted phenyl)phosphorodithioic acid (615 grams, 1 equivalent) is added to a mixture of 295 grams of mineral oil, 199 grams (1.5 equivalents) of strontium hydroxide octahydrate, and 5.4 grams (0.5 equivalent) of strontium acetate half-hydrate throughout a period of 6.5 hours at a temperature of 70° C. The reaction mixture is heated at 70° C. for one hour, at 90° C./30 mm. for 0.5 hour, mixed with a filtering aid, and filtered. The filtrate (870 grams) has a strontium content of 6.7%, a phosphorus content of 2.95%, a sulfur content of 3.04%, and a Sr:P weight ratio of 2.27. Another experiment, similar to the above except that no strontium acetate is used as the catalyst, results in a product having a strontium content of 5.08%, a phosphorus content of 2.75%, a sulfur content of 4.84%, and a Sr:P weight ratio of 1.85.

Example 23

To 939 grams (1.13 equivalent) of a polyisobutene (molecular weight of 1000)-substituted succinic anhydride (having an acid number of 100 and prepared by chlorinating the polyisobutene, reacting the chlorinated polyisobutene with a 20% molar excess of maleic anhydride), there is added 310 grams of mineral oil and 3.2 cc. of acetic acid. The mixture is heated to 88° C. and mixed with 119 grams (2.93 equivalents) of zinc oxide. The mixture is heated at 88°–110° C. for two hours whereupon 820 grams (1.1 equivalent) of di(chlorophenyl)phosphinodithioic acid is added to it at this temperature. The resulting mixture is then heated at 100°–110° C. and then at 150° C./20 mm. The residue is filtered. The filtrate (obtained in 94% of the theoretical yield) is found to have a phosphorus content of 1.97% and a zinc content of 5.4%. Another experiment similar to the above except that no acetic acid is used in the process results in a product (obtained in 95.9% of the theoretical yield) having a phosphorus content of 1.57% and a zinc content of 4.74%.

The metal salts of this invention are useful as additives in lubricating oils, gasolines, and fuel oils. They are also useful as insecticides, pesticides, ore-flotation agents, plasticizers, etc. When used in such applications, the metal salts are capable of imparting oxidation resistance and anti-corrosiveness to the compositions in which they are present. A particularly useful application of the metal salts is as extreme pressure agents and oxidation inhibiting agents in lubricants.

The concentration of the metal salts of this invention in a lubricating composition depends primarily upon the type of oil used and the nature of the service to which the lubricating composition is to be subjected. In most instances, the concentration will range from about 0.001% to about 5% by weight of the final lubricant. The concentration of the metal salts in a fuel oil or gasoline usually is within the range of from about 0.0001% to about 1% by weight.

The metal salts of this invention are unique in that they are especially resistant to deterioration when they are subjected to high temperature and prolong contact with air. This superior stability is an important quality, especially from the standpoint of the utility of the metal salts as additives in lubricants, fuel oils, and gasolines. The reason for such stability is not understood, but it is known that the stability is directly related to the presence of the catalyst in the reaction mixture from which the metal salt is prepared. The unusual stability of the metal salts of this invention is shown by a test which involves subjecting a sample of the metal salt to storage at 121° C. and determining the time required for the evolution of hydrogen sulfide from the sample (as an indication of degradation of the metal salt). The longer the period, the more stable the metal salt. The results are summarized in Table I below:

TABLE I

| Metal salt: | Test results (hours of storage until $H_2S$ is evolved) |
|---|---|
| A. Metal salt prepared by the catalyzed procedure of Example 10 | 189 |
| B. Same as A, except that no zinc acetate catalyst is used in the process of its formation | 9 |
| C. Metal salt prepared by the catalyzed procedure of Example 21 | 173 |
| D. Same as C, except that no zinc acetate catalyst is used in the process of its formation | 0 |

The lubricating oils in which the salts of this invention are useful may be of synthetic, animal, vegetable or mineral origin. Ordinarily, mineral lubricating oils are preferred by reason of their availability, general excellence, and low cost. For certain applications, oil belonging to one of the other three groups may be preferred. For instance, synthetic polyester oils such as didodecyl adipate and di-2-ethylhexyl sebacate are often preferred as jet engine lubricants. Normally, the lubricating oils preferred will be fluid oils ranging in viscosity from about 40 SUS (Saybolt Universal Seconds) at 100° F. to about 200 SUS at 210° F.

The lubricating compositions containing the metal salts of this invention may contain also other additives such as, for example, detergents of the ash type, detergents of the non-ash type, viscosity index improving agents, pour point depressing agents, anti-foam agents, and auxiliary extreme pressure agents, rust-inhibiting agents, and oxidation and corrosion inhibiting agents.

Ash-containing detergents are exemplified by the oil-soluble neutral and basic salts of alkali or alkaline earth metals with sulfonic acids, carboxylic acids containing at least 12 aliphatic carbon atoms, or organic phosphorus acids characterized by at least one direct carbon-to-phosphorus linkage such as those prepared by the treatment of an olefin polymer (e.g., one having a molecular weight of 700–100,000) with a phosphorizing agent such as phosphorus trichloride, phosphorus heptasulfide, phosphorus pentasulfide, phosphorus trichloride and sulfur, white phosphorus and a sulfur halide, or a phosphorothioic chloride. The most commonly used salts of such acids are those of sodium, potassium, lithium, calcium, strontium, and barium. Basic salts, i.e., those in which the metal is present in stoichiometrically larger amounts than the organic acid radical, are especially useful. The commonly employed methods for preparing the basic salts involve heating a mineral oil solution of an organic acid with a stoichiometric excess of a metal base such as a metal oxide, hydroxide, carbonate, bicarbonate, or sulfide at a temperature of around 50° C. and filtering the resulting mass. The use of a promoter, e.g., a phenol or alcohol, in the neutralization step to aid the incorporation of a large excess of metal is likewise known. A particularly effective method for preparing the basic salts comprises mixing an acid with an excess of a basic alkaline earth metal neutralizing agent, a phenolic promoter compound, and a small amount of water and then carbonating the mixture at an elevated temperature, e.g., 60°–200° C.

Detergents of a non-ash type include acylated alkylene polyamines such as tetraethylene pentamine obtained by reacting the amine with an alkenyl- or alkyl-substituted succinic anhydride or acid having at least 50 carbon atoms in the alkenyl or alkyl substituent; the reaction product of boric acid with the previously described acylated amine; and the copolymer of 5 parts of beta-diethylamino-ethyl acrylate with 95 parts of dodecyl methacrylate, etc.

Anti-foam agents include polymeric alkyl siloxanes, poly(alkyl methacrylates) and the condensation product of an alkyl phenol with formaldehyde and an amine. Pour point depressing agents are illustrated by polymers of ethylene, propylene, or isobutene and poly(alkyl methacrylates). Corrosion- and oxidation-inhibiting agents include hindered phenols such as 4-methyl-2,6-di-tert-butylphenol, N,N'-sec-butyl phenylene diamine, basic metal petroleum sulfates, metal phenates, amines, benzyl thiocyanates, etc. Film strength agents include, e.g., chlorinated petroleum oils containing from 20 to 70% of chlorine, chlorinated eicosane wax containing from 50 to 60% of chlorine, hexachloro-diphenyl ether, polychlorophenyl, polychlorobi-phenyl, etc. Oiliness agents include, e.g., methyl oleate, oleic acid, stearic acid, sulfurized sperm oil, sperm oil, corn oil, etc. Viscosity index improvers include, e.g., polymerized and copolymerized alkyl methacrylates, and polybutene.

The lubricating compositions may be prepared by adding one or more of the metal salts of this invention, alone or with other additives, to a lubricating oil. In many instances, it is advantageous to prepare concentrates of the salts of this invention with other additives and to later add the concentrate to lubricating oil. The following lubricants are illustrative. (All parts are by weight.)

*Example A*

| | Parts |
|---|---|
| SAE 30 mineral lubricating oil | 93.79 |
| Product of Example 3 | 1.00 |
| Tetraethylene pentamine acylated with an equivalent amount of polyisobutenyl (average molecular weight=850)-substituted succinic acid | 5.21 |
| Polymeric alkyl siloxane anti-foam agent | 0.003 |

Example B

| | Parts |
|---|---|
| SAE 10W–30 mineral lubricating oil | 87.41 |
| Product of Example 9 | 2.317 |
| Polymeric, viscosity index improving agent (interpolymer of (N-vinyl-2-pyrrolidone (10%) (by weight), butyl methacrylate (5%), and a mixture of $C_{12-15}$ alkyl methacrylate (85%) having a molecular weight of 50,000) | 5.1 |
| Tetraethylene pentamine acylated with 0.5 equivalent of the substituted succinic acid described in Example A (70% by volume); tetraethylene pentamine acylated with 1.5 equivalents of the same substituted succinic acid (15% by volume); and tetraethylene pentamine acylated with one equivalent of the same substituted succinic acid (15% by volume) | 2.67 |
| Carbonated, basic calcium petroleum sulfonate having a sulfate ash content of 40% | 2.50 |
| Polymeric alkyl siloxane anti-foam agent | 0.003 |

Example C

| | |
|---|---|
| SAE 30 mineral lubricating oil | 88.56 |
| Product of Example 10 | 3.77 |
| Carbonated, basic calcium phenate of sulfurized polyisobutene-substituted phenol prepared as described in Example 18 having a sulfate ash content of 18.93% concentrated at 62% in diluent oil | 4.49 |
| Tetraethylene pentamine (3 equivalents) acylated with 4 equivalents of the substituted succinic acid described in Example A | 2.07 |
| Carbonated, basic calcium petroleum sulfonate having a sulfate ash content of 16.4% and a base number of 82 | 1.11 |
| Polymeric alkyl siloxane anti-foam agent | 0.009 |

Example D

| | |
|---|---|
| SAE 30 mineral lubricating oil | 86.50 |
| Product of Example 10 | 3.73 |
| Reaction product of one equivalent of tetraethylene pentamine and an equivalent of the mono-zinc salt of the substituted succinic acid described in Example A | 2.07 |
| Carbonated, basic calcium phenate, as described in Example C | 4.78 |
| Carbonated (phenol promoted), basic barium salt of phosphosulfurized polyolefin (described in Example 15) having a sulfate ash content of 25% | 1.80 |
| Carbonated, basic calcium petroleum sulfonate as described in Example C | 1.12 |
| Polymeric alkyl siloxane anti-foam agent | 0.009 |

Example E

| | |
|---|---|
| SAE 30 mineral lubricating oil | 86.80 |
| Product of Example 10 | 3.73 |
| Calcium tetrapropylene-substituted phenate condensed with 1.5 moles of formaldehyde | 3.20 |
| Carbonated, basic calcium phenate as described in Example C, but having a sulfate ash content of 17.8% | 2.24 |
| Carbonated, basic calcium petroleum sulfonate as described in Example C | 1.73 |
| Carbonated, basic barium salt of phosphosulfurized polyolefin as described in Example D | 1.80 |
| Polymeric alkyl siloxane anti-foam agent | 0.009 |

Example F

| | |
|---|---|
| SAE 30 mineral lubricating oil | 90.49 |
| Product of Example 16 | 2.65 |
| Carbonated, basic calcium phenate as described in Example E | 4.78 |
| Tetraethylene pentamine acylated as indicated in Example C | 2.08 |
| Polymeric alkyl siloxane anti-foam agent | 0.009 |

Example G

| | Parts |
|---|---|
| SAE 10W–30 mineral lubricating oil | 87.86 |
| Product of Example 17 | 3.60 |
| Polymeric, viscosity index improving agent as described in Example B | 5.08 |
| Mixture of acylated polyethylene tetramines described in Example B | 2.67 |
| Neutral zinc salt of a mixture of phosphorodithioic acids prepared as indicated in Example 4 | 0.79 |
| Polymeric alkyl siloxane anti-foam agent | 0.003 |

Example H

| | |
|---|---|
| SAE 30 mineral lubricating oil | 87.88 |
| Product of Example 18 | 3.90 |
| Carbonated, basic calcium phenate as described in Example C | 4.50 |
| Acylated tetraethylene pentamine as described in Example C | 4.17 |
| Polymeric alkyl siloxane anti-foam agent | 0.009 |

Example I

| | |
|---|---|
| SAE 10 mineral lubricating oil | 85.8 |
| Product similar to that of Example 3A, but having a zinc content of 10.6%, a phosphorus content of 7.49%, a sulfur content of 13.48%, and a base number of 36 using bromphenol blue indicator | 0.24 |
| Carbonated, basic calcium petroleum sulfonate as described in Example C | 9.75 |
| Carbonated (phenol promoted), basic barium petroluem sulfonate having a sulfate ash content of 38.5% | 2.08 |
| Calcium salt of the condensation product of heptylphenol (1 mole) and formaldehyde (1.5 moles) | 2.00 |
| Anthranilic acid | 0.075 |
| Polymeric alkyl siloxane | 0.02 |

Example J

| | |
|---|---|
| SAE 30 mineral lubricating oil | 87.67 |
| Product similar to that of Example 10 but having a zinc content of 9.31%, a phosphorus content of 6.95%, a sulfur content of 14.66%, and a base number of 37 using bromphenol blue indicator | 0.89 |
| Reaction product of tetraethylene pentamine with one equivalent of the mono-zinc salt of the substituted succinic acid described in Example D | 8.44 |
| Carbonated, basic calcium phenate described in Example E | 3.00 |
| Polymeric alkyl siloxane anti-foam agent | 0.009 |

The effectiveness of the metal salts of this invention as lubricant additives is illustrated by the Caterpillar 1-G engine test. In this test, a lubricating composition to be tested is used in the crankcase of a four-stroke cycle diesel engine having a 5⅛" bore and a compression ratio of 15:1 which is operated on a diesel fuel having a sulfur content of 0.4% under the following conditions: speed, 1800 r.p.m.; B.t.u. input per minute, 5850; load, 40 brake-horsepower; water jacket outlet temperature, 190° F.; oil temperature, 205° F. and crankcase lubricant change interval, 120 hours. The lubricating composition is evaluated according to (1) the piston cleanliness (rating scale of 0–100, 100 being indicative of no deposit and 0 being indicative of heavy deposits) and (2) the amount of ring filling. By this test, the lubricating composition of Example C passes the test with these rating at the end of 240 hours of testing: piston cleanliness rating of 89.5 and ring filling of 11%.

What is claimed is:

1. A lubricating composition comprising a major portion of a mineral lubricating oil and from about 0.001% to about 5% by weight of a metal salt prepared by the process comprising the reaction of a Group II metal base with a phosphorus acid of the structural formula

wherein one R is selected from the class consisting of hydrocarbon and hydrocarbon-oxy radicals and the other R is a hydrocarbon radical, each of the foregoing radicals having up to about 200 carbon atoms in the hydrocarbon group and X is oxygen or sulfur in the presence of a catalyst selected from the class consisting of carboxylic acids having up to about 10 aliphatic carbon atoms and salts thereof with a metal selected from the class consisting of Group I metals, Group II metals, aluminum, iron, nickel, cobalt, and copper.

2. The lubricating composition of claim 1 wherein the Group II metal base is zinc oxide.

3. The lubricating composition of claim 1 wherein the phosphorus acid is a phosphinodithioic acid.

4. The lubricating composition of claim 1 wherein the catalyst is acetic acid.

5. A lubricating composition comprising a maor proportion of a mineral lubricating oil and from about 0.001% to about 5% by weight of a metal salt of a phosphorus acid wherein the ratio of equivalents of the metallic radical to the phosphorus acid radical is at least 1, said metal salt being prepared by the process comprising the reaction of more than 1 and less than about 2 equivalents of a Group II metal base with 1 equivalent of a mixture of a dialkylphosphorodithioic acid having up to about 200 carbon atoms in each alkyl group and a phosphorus acid according to claim 1 in the presence of a catalytic amount of a carboxylic acid having up to about 10 aliphatic carbon atoms or a Group II metal salt thereof.

6. The lubricating composition of claim 5 wherein the Group II metal base is zinc oxide and the Group II metal salt of the carboxylic acid is a zinc salt.

7. The lubricating composition of claim 5 wherein the carboxylic acid is acetic acid.

8. A lubricating composition comprising a major proportion of a mineral lubricating oil and from about 0.001% to about 5% by weight of a metal salt of a phosphorus acid wherein the ratio of equivalents of the metallic radical to the phosphorus acid radical is at least 1, said metal salt being prepared by the process comprising the reaction of more than 1 and less than about 2 equivalents of a Group II metal base with 1 equivalent of a mixture of a dialkylarylphosphorodithioic acid having up to about 200 carbon atoms in each alkyl group and a phosphorus acid according to claim 1 in the presence of a catalytic amount of a carboxylic acid having up to about 10 aliphatic carbon atoms or a Group II metal salt thereof.

9. The lubricating composition of claim 8 wherein the Group II metal base is zinc oxide and the Group II metal salt of the carboxylic acid is a zinc salt.

10. The lubricating composition of claim 8 wherein the carboxylic acid is acetic acid.

11. A lubricating composition comprising a major proportion of a mineral lubricating oil and from about 0.001% to about 5% by weight of a metal salt prepared by the process comprising the reaction of a Group II metal base with a mixture of phosphorus acids of the structural formula

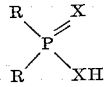

wherein R is selected from the class consisting of hydrocarbon and hydrocarbon-oxy radicals having up to about 200 carbon atoms in the hydrocarbon group, said mixture including at least one acid wherein R is hydrocarbon and X is oxygen or sulfur in the presence of a catalyst selected from the class consisting of carboxylic acids having up to about 10 aliphatic carbon atoms and salts thereof with a metal selected from the class consisting of Group I metals, Group II metals, aluminum, iron, nickel, cobalt, and copper.

12. A lubricating composition comprising a major proportion of a mineral lubricating oil and from about 0.001% to about 5% by weight of a metal salt prepared by the process comprising the reaction of from about 1 to 2 equivalents of a Group II metal base with 1 equivalent of a mixture of a diarylphosphinodithioic acid and a hydrocarbon-substituted succinic acid having at least about 50 aliphatic carbon atoms in the substituent, having up to about 200 carbon atoms in each aryl group in the presence of a catalytic amount of a carboxylic acid having up to about 10 aliphatic carbon atoms or a Group II metal salt thereof.

13. The lubricating composition of claim 12 wherein the diarylphosphinodithioic acid is di(chlorophenyl) phosphinodithioic acid.

References Cited
UNITED STATES PATENTS

| | | | |
|---|---|---|---|
| 2,797,238 | 6/1957 | Miller et al. | 252—32.7 X |
| 3,000,822 | 9/1961 | Higgins et al. | 252—32.7 |
| 3,018,247 | 1/1962 | Anderson et al. | 252—32.7 |
| 3,219,666 | 11/1965 | Norman et al. | 252—51.5 X |
| 3,231,587 | 1/1966 | Rense | 252—56 X |
| 3,234,130 | 2/1966 | Nixon et al. | 252—39 |
| 3,290,347 | 12/1966 | Miller. | |

DANIEL E. WYMAN, *Primary Examiner.*

P. P. GARVIN, *Assistant Examiner.*